US010451436B2

(12) United States Patent
Thomas et al.

(10) Patent No.: US 10,451,436 B2
(45) Date of Patent: Oct. 22, 2019

(54) GENERATING ROUTES USING EVENTS

(71) Applicant: Microsoft Technology Licensing, LLC, Redmond, WA (US)

(72) Inventors: Myron Clifford Thomas, Newcastle, WA (US); Felix Gerard Torquil Ifor Andrew, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 74 days.

(21) Appl. No.: 15/486,213

(22) Filed: Apr. 12, 2017

(65) Prior Publication Data

US 2018/0299291 A1 Oct. 18, 2018

(51) Int. Cl.
*G01C 21/36* (2006.01)
*G01C 21/34* (2006.01)

(52) U.S. Cl.
CPC ..... *G01C 21/3694* (2013.01); *G01C 21/3484* (2013.01); *G01C 21/3492* (2013.01); *G01C 21/3667* (2013.01)

(58) Field of Classification Search
CPC ............ G01C 21/3694; G01C 21/3484; G01C 21/3492; G01C 21/3667
See application file for complete search history.

(56) References Cited

U.S. PATENT DOCUMENTS

| | | | | |
|---|---|---|---|---|
| 8,024,111 B1* | 9/2011 | Meadows | .......... | G01C 21/3492 340/905 |
| 8,972,429 B2* | 3/2015 | Goldstein | ............ | G06Q 10/109 705/5 |
| 9,129,525 B2* | 9/2015 | Frish | ...................... | G08G 1/095 |
| 9,437,107 B2 | 9/2016 | Scofield et al. | | |
| 9,501,928 B1* | 11/2016 | Bell | ........................ | H04W 4/21 |
| 2009/0271104 A1* | 10/2009 | Letchner | ............ | G01C 21/3484 701/532 |
| 2010/0027527 A1* | 2/2010 | Higgins | .................. | H04W 4/18 370/351 |

(Continued)

OTHER PUBLICATIONS

Ackerson, Noble, "How adding traffic predictions in calendars can save the world", https://medium.com/@nobleackerson/how-adding-traffic-predictions-to-calendars-can-save-the-world-d1336e838f89, Published on: Nov. 9, 2015, 2 pages.

(Continued)

*Primary Examiner* — Courtney D Heinle
(74) *Attorney, Agent, or Firm* — Holzer Patel Drennan

(57) ABSTRACT

A map application is provided that receives calendars from one or more sources. Each calendar may include events, and each event may be associated with a location and a time period. The events may be a temporary event that may impact traffic around the location of the event for the time period associated with the event. When a request for a route for a future trip is received by the map application, the map application may generate a route in response to the request. The map application may determine if any of the events associated with a calendar impact the route. An event may impact the route if the route passes near the location associated with the event during the time period associated with the event. If the route is impacted by an event, an alternative route is generated or a new time is recommended for the future trip.

17 Claims, 9 Drawing Sheets

(56) References Cited

U.S. PATENT DOCUMENTS

| | | | | |
|---|---|---|---|---|
| 2010/0094529 A1* | 4/2010 | Gupta | G06F 17/30017 | 701/117 |
| 2010/0205060 A1* | 8/2010 | Athsani | G01C 21/3484 | 705/14.58 |
| 2011/0087426 A1* | 4/2011 | Feng | G01C 21/343 | 701/532 |
| 2011/0106436 A1* | 5/2011 | Bill | G01C 21/3407 | 701/467 |
| 2011/0106592 A1* | 5/2011 | Stehle | G06Q 10/04 | 705/14.1 |
| 2011/0112747 A1* | 5/2011 | Downs | G08G 1/0104 | 701/118 |
| 2012/0136572 A1* | 5/2012 | Norton | G01C 21/3407 | 701/465 |
| 2014/0249747 A1* | 9/2014 | Kosseifi | G01C 21/3415 | 701/428 |
| 2014/0278031 A1* | 9/2014 | Scofield | G08G 1/00 | 701/118 |
| 2014/0330505 A1* | 11/2014 | Wenneman | G01C 21/3484 | 701/117 |
| 2014/0358435 A1* | 12/2014 | Bell | G01C 21/3492 | 701/527 |
| 2014/0372030 A1* | 12/2014 | Leader | G01C 21/3617 | 701/526 |
| 2015/0168169 A1* | 6/2015 | Caceres | G01C 21/3492 | 701/537 |
| 2015/0292894 A1* | 10/2015 | Goddard | G01C 21/3453 | 701/400 |
| 2016/0357804 A1* | 12/2016 | McGavran | G06F 17/30368 | |

OTHER PUBLICATIONS

Graham-Rowe, Duncan, "Smart traffic forecast offers seven-day predictions", https://www.newscientist.com/article/dn7605-smart-traffic-forecast-offers-seven-day-predictions/, Published on: Jun. 29, 2005, 1 pages.

* cited by examiner

GENERATING ROUTES USING EVENTS

BACKGROUND

Map applications are a popular type of application, with a variety of uses. For example, a user may use a map application to determine directions, or may use a map application to determine restaurants, banks, drugstores, and other entities near a current location. Map applications are commonly integrated into smartphones, tablets, and vehicle navigation systems, and may be accessed by any computing device though the Internet.

One popular use for map applications is to plan for future trips. For example, a user may use a map application to get directions for a trip they are planning to take next month, or a user may use a map application to look for hotels that are near a city that they are visiting in a few weeks.

Map applications typically consider current traffic conditions when generating directions. For future trips, the map applications are limited to considering historical traffic information when generating directions. For example, a map application may generate directions that avoid areas that are known to be congested during rush hour.

However, map applications do not currently consider traffic or other conditions that may be caused by scheduled events when generating directions or travel recommendations. Scheduled events may be future events such as concerts, festivals, sporting events, parades, protests, etc. These events often cause traffic conditions in their immediate area, but because they occur infrequently, or occur according to an irregular schedule, they may not be reflected in the historical traffic information. As a result, a user may be provided a poor travel experience.

SUMMARY

A map application is provided that receives calendars from one or more sources. Each calendar may include events, and each event may be associated with a location and a time period. The events may include parades, sporting events, festivals, concerts, and any other temporary event that may impact traffic around the location associated with the event for the time period associated with the event. When a request for a route for a future trip is received by the map application, the map application may generate a route in response to the request. The map application may determine if any of the events associated with a calendar impact the route. An event may impact the route if the route passes near the location associated with the event during the time period associated with the event. If the route is impacted by an event, an alternative route is generated or a new time is recommended for the future trip.

In an implementation, a system for receiving events, and for generating a route in response to a request based on a time period associated with each event and a time associated with the request, is provided. The system includes at least one computing device and a map engine. The map engine may be adapted to: receive a map; receive a plurality of events, wherein each event is associated with a time period, and each event is associated with a location; receive a request, wherein the request is associated with an origin location, a destination location, and a time; generate a first route between the origin location and the destination location based on the map; determine an event of the plurality of events that impacts the generated first route based on the first route, the location associated with each event, the time period associated with each event, and the time associated with the request; and in response to the determined event, generate a second route between the origin location and the destination location, wherein the determined event does not impact the second route.

In an implementation, a system for receiving events, and for generating a route in response to a request based on a time period associated with each event and a time associated with the request, is provided. The system includes at least one computing device and a map engine. The map engine may be adapted to: receive a request, wherein the request is associated with a location, an arrival time, and a departure time; determine a plurality of entities that are responsive to the request based on a location associated with each entity and the location associated with the request; receive a plurality of events, wherein each event is associated with a time period, and each event is associated with a location; for each entity of the plurality of entities, determine one or more events of the plurality of events that impacts the entity based on the location associated with the entity, the locations associated with the plurality of events, the time periods associated with the plurality of events, and the arrival time and the departure time associated with the request; and provide information about the plurality of entities and the determined one or more events.

In an implementation, a method for recommending routes based on a request and one or more events is provided. The method includes: receiving a plurality of events by a computing device, wherein each event is associated with a time period and a severity level, and each event is associated with a location on a map; receiving a request by the computing device, wherein the request is associated with an origin location on the map, a destination location on the map, and a time; generating a first route between the origin location and the destination location based on the map by the computing device; determining an event of the plurality of events that impacts the generated first route based on the first route, the location associated with each event, the time period associated with each event, and the time associated with the request by the computing device; in response to the determined event, generating a second route between the origin location and the destination location by the computing device, wherein the determined event does not impact the second route; determining a first estimated time of arrival at the destination location using the first route based on the severity level associated with the determined event by the computing device; determining a second estimated time of arrival at the destination location using the second route by the computing device; and recommending either the first route or the second route based on the first estimated time of arrival and the second estimated time of arrival by the computing device.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
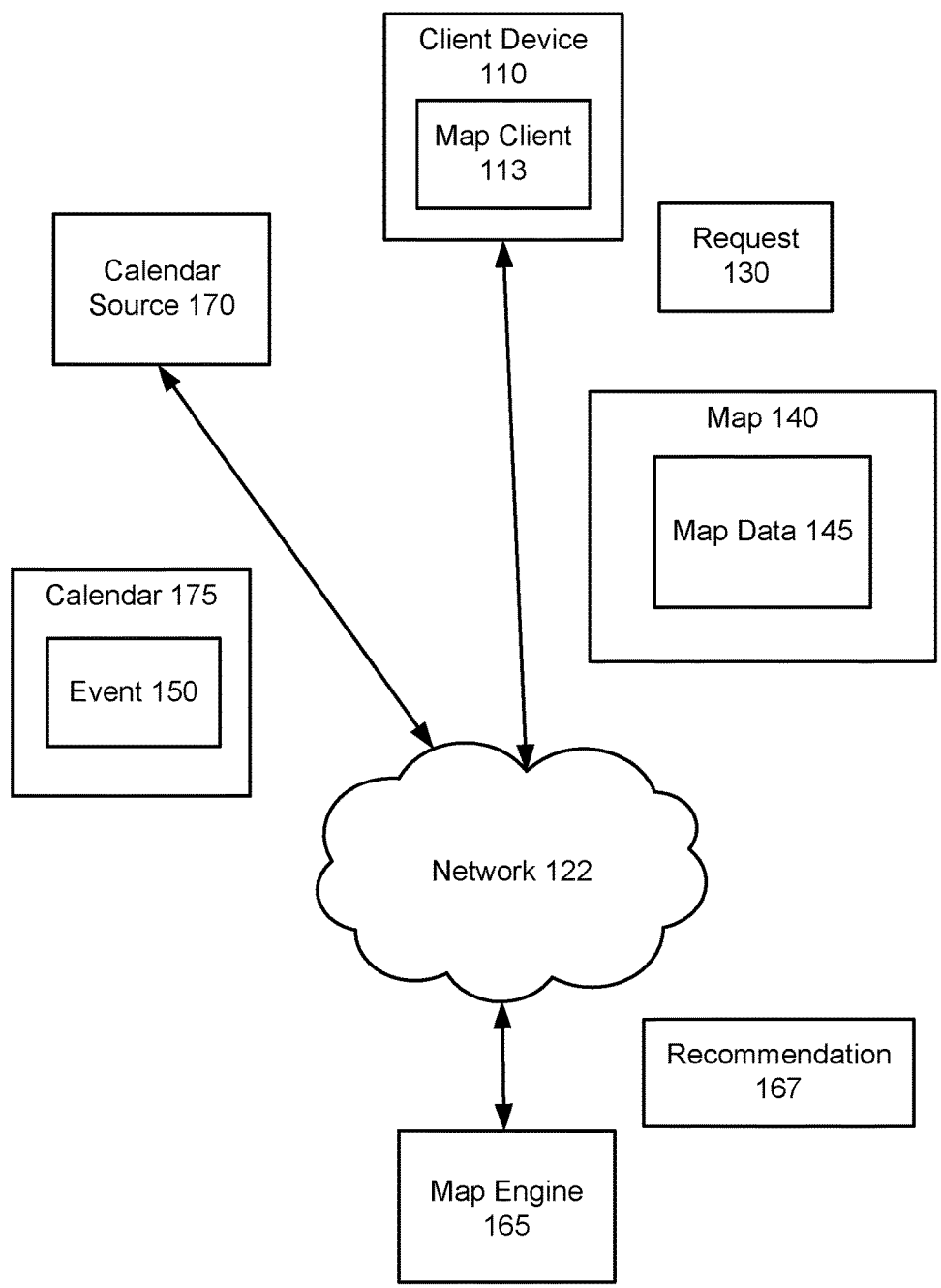
FIG. 1 is an illustration of an exemplary environment for determining recommendations in response to requests using events.

FIG. 1 is an illustration of an exemplary environment 100 for determining recommendations in response to requests using events. The environment 100 may include a map engine 165, a calendar source 170, and one or more client devices 110 in communication through a network 122. The network 122 may be a variety of network types including the public switched telephone network (PSTN), a cellular telephone network, and a packet switched network (e.g., the Internet). Although only one client device 110, one map engine 165, and one calendar source 170 are shown in FIG. 1, there is no limit to the number of client devices 110, map engines 165, and calendar sources 170 that may be supported.

Figure 9:
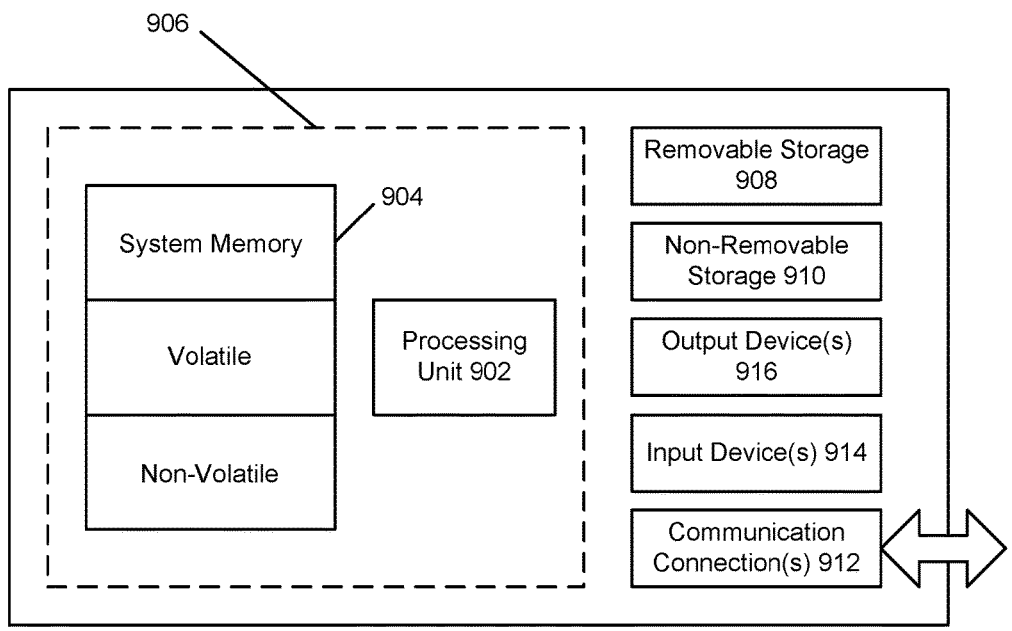
FIG. 9 shows an exemplary computing environment in which example embodiments and aspects may be implemented.

The client device 110, the map engine 165, and the calendar source 170 may be implemented using a variety of computing devices such as smart phones, desktop computers, laptop computers, tablets, vehicle navigation systems, and video game consoles. Other types of computing devices may be supported. A suitable computing device is illustrated in FIG. 9 as the computing device 900.

Each client device 110 may further include a map client 113. The map client 113 may be used by a user of the client device 110 to view and interact with one or more maps 140. Depending on the implementation, the map client 113 may be, or may be part of, a map application. An example map application is the map application integrated into many smartphones and tablet computers.

Each map 140 may include map data 145. The map data 145 may include the various features of the map 140 such as roads, buildings, bodies of water, parks, landmarks, etc. The map data 145 may also include locations and other information about entities such as hotels, restaurants, bars, stores, universities, hospitals, etc. The map data 145 may further include information such as traffic data (real-time and historical). The map data 145 may further include information about public transportation, trains, ferries, bike trails, and other modes of transportation. Other information may be included in the map data 145.

The map engine 165 may use the map data 145 to generate recommendations 167 in response to requests 130 received from users associated with the map client 113. The requests 130 may include requests for a route between an origin location and a destination location. The map engine 165 may use the map data 145 to determine a route between the origin location and the destination location. Depending on the implementation, the route may be a shortest route by time or by distance. Other parameters for determining a route may be used. The map engine 165 may provide the determined route as a recommendation 167. Note that the determined routes are not limited to roads or driving. For example, a determined route may consist of combinations of one or more of public and private transportation systems, bike routes, and water ways or water based routes.

The requests 130 may also include requests for certain types of entities at or around a location. For example, a user may generate a request 130 for hotels near a certain location. The map engine 165 may use the map data 145 to identify hotels that are near the location associated with the request 130. The map engine 165 may provide the identified hotels as a recommendation 167.

A request 130 may also be associated with a time. The time associated with the request 130 may be the time (i.e., date and time) that the user desires to use the recommendation 167. For example, a user may generate a request 130 for a route from New York to Los Angeles to use at 5 am on Dec. 27, 2017. In another example, a user may generate a request 130 for a restaurant recommendation that is close to their hotel at 7 pm on Jan. 8, 2018.

Because such requests 130 are for the future, the map engine 165 may not have access to current traffic conditions when generating recommendations 167 in response to such requests 130. Accordingly, the generated recommendations 167 may fail to account for traffic conditions that may arise when the users ultimately use the recommendations 167.

To help account for future traffic conditions and other conditions that may result in a poor travel experience, the map engine 165 may receive and consider one or more events 150. An event 150 may represent a future scheduled event such as a parade, sporting event, protest, concert, show, convention, festival, and any other event that may directly or indirectly affect traffic.

As described further herein, each event 150 may be associated with a location of where the event 150 is taking place along with a time period that describes when and for how long the event 150 will disrupt traffic. When generating a recommendation 167, such as a route for a future trip, the map engine 165 may determine if the generated route is impacted by any known event 150. An event 150 may impact a route if a user following the route will pass through or near a location associated with the event 150 during the time period associated with the event 150. If an event 150 impacts a route, the map engine 165 may use the map data 145 to generate an alternative route that avoids the event 150. Both routes may be provided to the user as part of the recommendation 167 along with information about the event 150.

The map engine 165 may learn about events 150 from one or more calendars 175. A calendar 175 may be a collection of events 150 published by a calendar source 170. A calendar source 170 may be associated with a business or any other organization. For example, a calendar source 170 such as a state university may publish a calendar 175 that includes events 150 associated with the university such as graduation, move-in day, football games, homecoming, and any other events 150 that are likely to affect traffic or travel in the area surrounding the location of the university. In another example, a calendar source 170 such as a city may publish a calendar 175 that includes events 150 such as festivals, road closures, road repairs, and parades that are scheduled in the city. In another example, a calendar source 170 such as a stadium may publish a calendar 175 with all of the events 150 that are scheduled to occur in the stadium.

Depending on the implementation, the map engine 165 may subscribe to each calendar source 170, and may receive calendars 175 directly from the calendar sources 170. In another example, a calendar source 170 may aggregate calendars 175 from a variety of other calendar sources 170, and may provide the aggregated calendars 175 to the map client 165.

Figure 2:
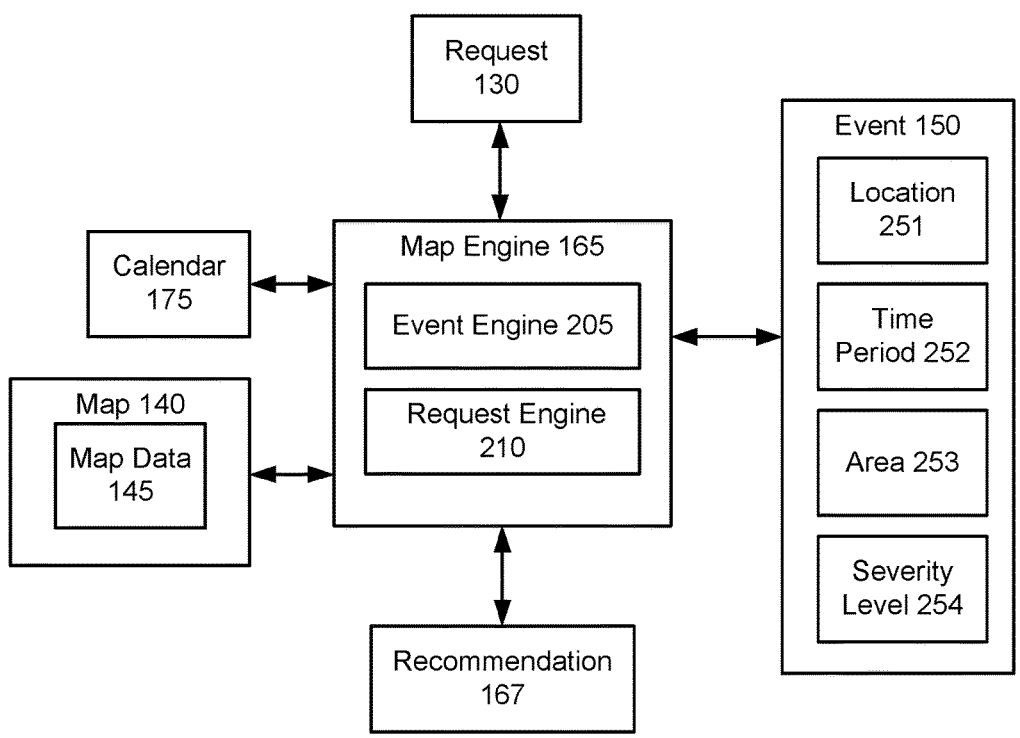
FIG. 2 is an illustration of an implementation of an exemplary map engine.

FIG. 2 is an illustration of an implementation of an exemplary map engine 165. The map engine 165 may include one or more components including an event engine 205 and a request engine 210. More or fewer components may be included in the map engine 165. Some or all of the components of the map engine 165 may be implemented by one or more computing devices such as the computing device 900 described with respect to FIG. 9. In addition, some or all of the functionality attributed to the map engine 165 may be performed by the map client 113, and vice versa. Moreover, some or all of the functionality of the map engine 165 and/or the map client 133 may be performed by a cloud computing platform.

The event engine 205 may receive a plurality of events 150. Depending on the implementation, the plurality of events 150 may be received from one or more calendars 175. Each event 150 may include one or more of a location 251, a time period 252, an area 253, and a severity level 254.

The location 251 associated with an event 150 may be the place where the event 150 will take place. Depending on the implementation, the location 251 may be latitude and longitude coordinates, or may be a street address. Other location identifying information may be used. An event 150 may be associated with a single location 251 or may be associated with multiple locations 251. For example, an event 150 such as a concert may be associated with a single location 251 that is a stadium. In contrast, an event 150 such as the Olympics may include locations 251 for multiple stadiums and venues.

The time period 252 associated with an event 150 may be the times and/or dates of when the event 150 is scheduled to occur. In some implementations, the time period 252 may be the times and/or dates that the event 150 is expected to adversely affect traffic conditions. Thus, for example, if an event 150, such as a parade that runs from 2 pm-3 pm on May 5, 2017 is expected to affect traffic from 10 am-5 pm, then the time period 252 associated with the event 150 may be 10 am-5 pm on May 5, 2017.

An event 150 may be associated with a single time period 252 or may be associated with multiple time periods 252. For example, an event 150 associated with a professional football game may be expected to affect traffic from 11 am-1 pm on Sep. 17, 2017 (when attendees are arriving), and from 4 pm-5 pm on Sep. 17, 2017 (when attendees are leaving). Accordingly, the event 150 may be associated with time periods 252 of both 11 am-1 pm on Sep. 17, 2017 and 4 pm-5 pm on Sep. 17, 2017.

The area 253 associated with an event 150 may represent the area that is likely to be affected by the event 150. In some implementations, the area 253 may be a radius that defines a circle around the location 251 associated with the event. For example, if the location 251 is the address of a stadium and the area 253 is a radius of 1 mile, then the associated event 150 affects an area defined by a circle of radius of 1 mile around the stadium.

In some implementations, the area 253 may be one or more roads (i.e., highways). For example, the area 253 may list the roads near the location 251 that are likely to be affected by the event 150. Similar to the locations 251 and the time periods 252, an event 150 may be associated with multiple areas 253.

The severity level 254 associated with an event 150 may be a measure of how the event 150 is expected to affect or impact the traffic in the area 253 associated with the event 150 during the time period 252. Depending on the implementation, the severity level 254 may be in the form of a scale such as "severe", "moderate", "light", etc. Alternatively, the severity level 254 may be a number that indicates the expected delay such as 15 minutes, 30 minutes, 1 hour, etc. Any one of a variety of known traffic reporting or forecasting standards may be used.

The request engine 210 of the map engine 165 may receive requests 130, and may generate recommendations 167 in response to the requests 130 using the events 150, and the map data 145. Where the request 130 is a request for a route between an origin location and a destination location at a future date, the request engine 210 may generate route using the map data 145.

The request engine 210 may initially generate the route without considering the events 150 using whatever criteria that has been provided by the user. For example, the user may prefer that the request engine 210 always generate the fastest route, or the shortest route by distance. Alternatively, for example, the user may prefer a route that is scenic, or that avoids cities or highways.

After generating the route, the request engine 210 may determine whether the generated route is impacted by any of the events 150. An event 150 may impact a route if the route is near or passes through the area 253 associated with the event 150 during a time that is within the time period 252 associated with the event 150.

For example, if an event 150 has an area 253 of a radius of 500 yards with a location 251 such as a stadium for a time period 252 of Jan. 1, 2018, then the event 150 may impact any route that passes within 500 yards of the stadium at any time on Jan. 1, 2018. In another example, if an event 150 has an area 253 that is a road such as 1-95 and a location 251 of a concert venue for a time period 252 of 6 pm-11:59 pm on Jan. 13, 2018, then the event 150 may impact any route that passes the concert venue on 1-95 between 6 pm and 11:59 pm on Jan. 13, 2018.

When the request engine 210 determines an event 150 that impacts the route, the request engine 210 may generate a recommendation 167 that includes the route and also includes information about the determined event 150. The information may be an alert or a notification that alerts the user to the event 150. Depending on the implementation, the request engine 210 may use the severity level 254 associated with the event 150 to estimate how much time the event 150 may add to the trip using the route.

In some implementations, the request engine 210 may further generate an alternative route that is not impacted by the event 150, and may present the alternative route to the user with the recommendation 167. The alternative route may be displayed to the user along with the original route and may be presented with some indication of the time and/or distance associated with each route (e.g., an estimated time of arrival for each route). Depending on the implementation, if the alternative route is impacted by a different event 150, additional alternative routes may be generated and displayed to the user, as described above.

Depending on the implementation, the request engine 210 may present an alternative route when the estimated time of arrival for the alternative route is less than the estimated time of arrival for the original route when factoring the impact of the event 150. Other criteria may also be used. For example, a user may only want to receive alternative routes that are no more than a threshold distance greater than the original route.

In some implementations, the request engine 210 may recommend that the user change the time associated with the request 130. For example, the request engine 210 may determine that the user may avoid the event 150 by delaying their trip by two hours, or by leaving two hours earlier. In another example, the request engine 210 may determine that the user may avoid the event 150 by leaving a week later. The recommended date and/or time change may be included by the request engine 210 in the recommendation 167.

In some implementations, the request 130 may not be for a route, but may be for an entity such as a restaurant or a hotel for a particular time period and location. For example, a user may generate a request 130 for a hotel in Pittsburgh, Pa. from Mar. 23, 2017 through Mar. 28, 2017.

For such requests 130, the request engine 210 may initially locate entities that are responsive to the request 130 using the map data 145. Continuing the example above, the request engine 210 may determine hotels that are in or near Pittsburgh, or hotels that are in Pittsburgh that have availability from Mar. 23, 2017 through Mar. 28, 2017.

After locating the entities that are responsive to the request 130, the request engine 210 may determine whether there are any events 150 that may impact any of the responsive entities. Continuing the example above, the request engine 210 may determine whether there are any events 150 with locations 251 that are near any of the hotels with time periods 252 that are within Mar. 23, 2017 through Mar. 28, 2017. Alternatively, the request engine 210 may determine if any the determined hotels fall within the areas 253 of any events 150 for the associated time periods 252.

The request engine 210 may generate recommendations 167 that include the responsive entities and any determined events 150. The recommendations 167 may indicate which entities are affected by the determined events 150. Continuing the example above, information about each hotel may be displayed to the user in the recommendation 167. Each hotel that is impacted by an event 150 may be displayed with an icon or other indication that there is an event 150 that may impact the hotel. Depending on the implementation, a brief description of each event 150 may also be provided.

Figure 3:
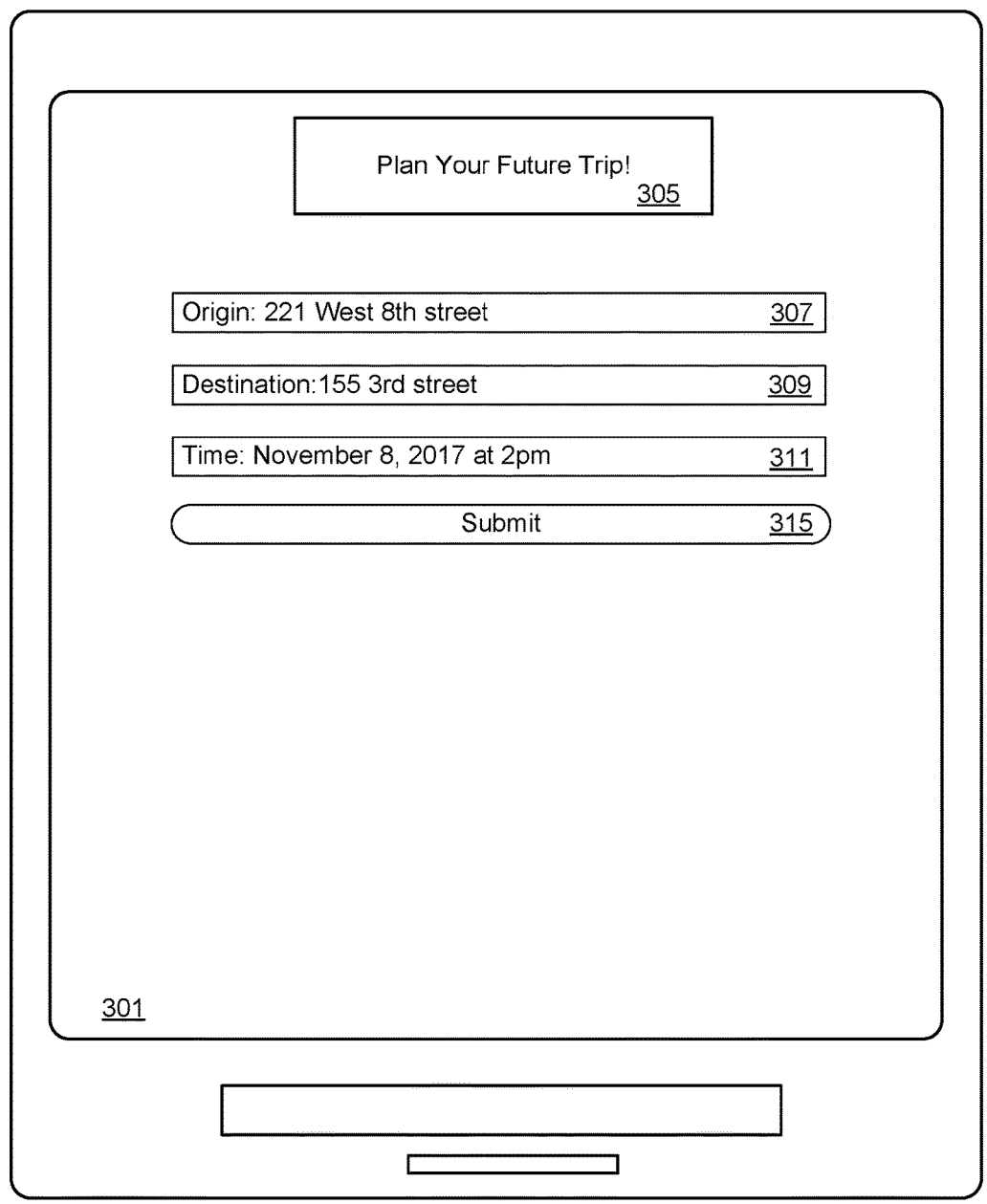
FIGS. 3-5 are illustrations of example user interfaces for generating a request, and for receiving a recommendation that is generated based on the request and one or more events.

FIG. 3 is an illustration of an example user interface 300 for generating a request 130, and for receiving a recommendation 167 that is generated based on the request 130 and one or more events 150. The user interface 300 may be implemented by a map client 113 executing on a client device 110. As shown, the user interface 300 is displayed on a tablet computing device. However, the user interface 300 may also be displayed by other computing devices such as smartphones and desktop or laptop computers.

As shown in a window 301, a user is initially presented with a text box that instructs the user to "Plan Your Future Trip!" The user may provide a request 130 including an origin, a destination, and a time using the user interface elements 307, 309, 311, and 315, respectively. In the example shown, the user has provided an origin of "221 West 8th Street" in the user interface element 307, a destination of "155 3rd Street" in the user interface element 309, and a time of "Nov. 8, 2017 at 2 pm" in the user interface element 311. After entering the request 130, the user may submit the request 130 by pressing or touching the user interface element 315 labeled "Submit." In response, the map client 113 may generate the request 130, and may provide the request 130 to the map engine 165.

Figure 4:
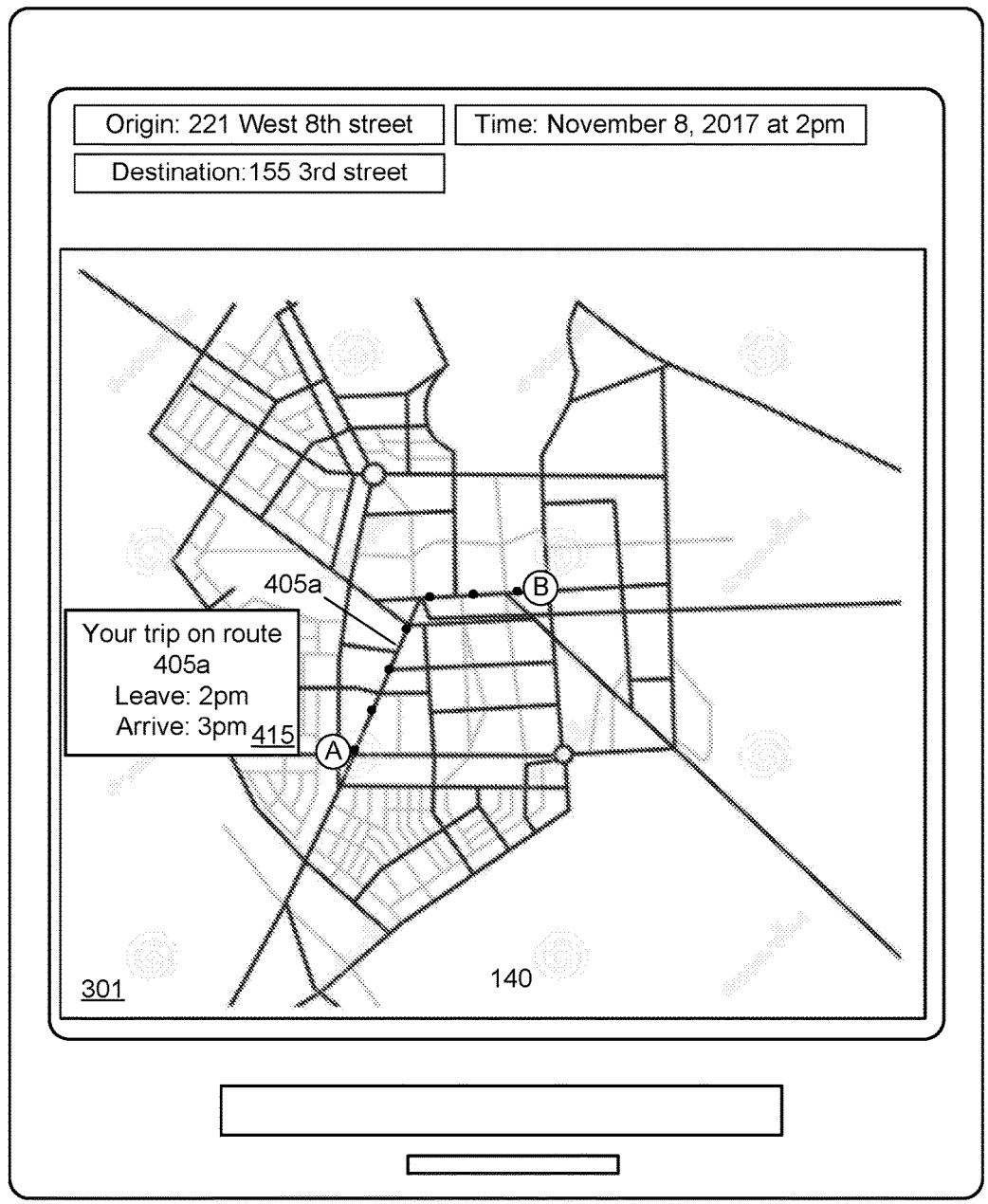

Continuing to FIG. 4, in response to the request 130, the request engine 210 of the map engine 165 has generated a recommendation 167 that includes a route 405a. The route 405a is illustrated as a dotted line in the window 301 on top of a map 140. In the example shown, the origin of "221 West 8th Street" is represented by the icon labeled "A" and the destination of "155 3rd Street" is represented as the icon labeled "B".

In addition, the window 301 includes a window 415 that indicates that a trip using the route 405a that leaves at 2 pm is estimated to arrive at 3 pm. The route 405a may be the shortest route between the origin and the destination.

Figure 5:
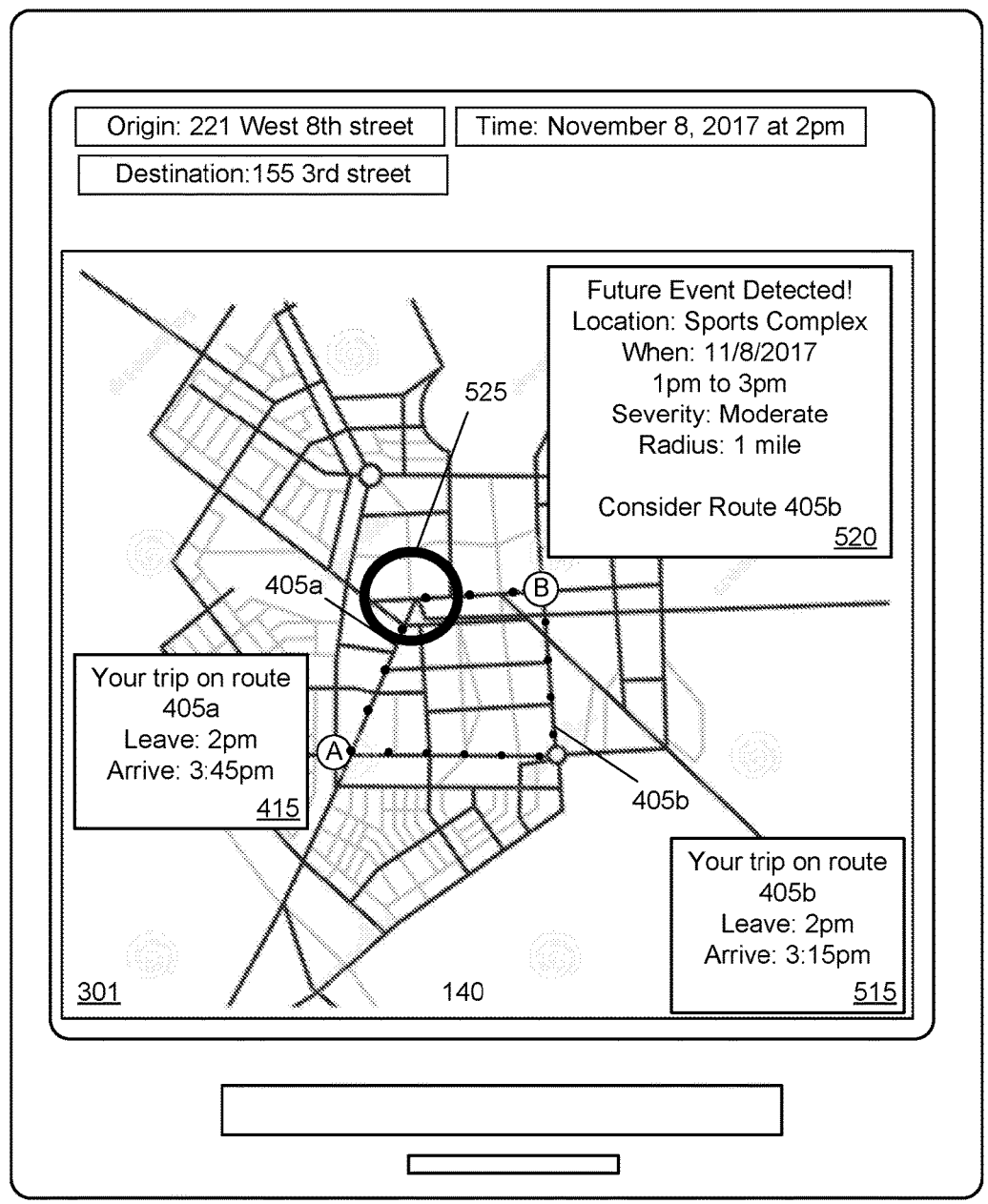

Continuing to FIG. 5, the event engine 205 may have determined that an event 525 impacts the route 405a. In the window 301, the event 525 is represented by a circular icon. The size of the circular icon used to represent the event 525 may be based on the area 253 associated with the event 525. As shown, the route 405a passes through the event 525.

As an alternative to the route 405a, the window 301 further includes a route 405b on top of the map 140. The route 405b connects the same origin and the same destination as the route 405a, but is not impacted by the event 525. The route 405b is similarly illustrated as a dotted line.

To alert the user to the event 525 and the route 405b, the window 301 also includes a window 520 that indicates that "Future Event Detected!" The window 520 includes information about the event 525 such as the location 251 ("Sports Complex"), the time period 252 ("Nov. 8, 2017" from "1 pm to 3 pm"), the area 253 ("Radius: 1 mile"), and the severity level 254 ("Moderate"). The window 520 also includes text instructing the user to "Consider Route 405b".

To allow the user to consider the route 405b, the window 301 also includes a window 515 that that indicates that a trip using the route 405b that leaves at 2 pm is estimated to arrive at 3:15 pm. In addition, the estimated arrival time of a trip using the route 405a has been updated in the window 415 to account for a delay due to the event 525. The new arrival time for the route 405a is now 3:45 pm.

Figure 6:
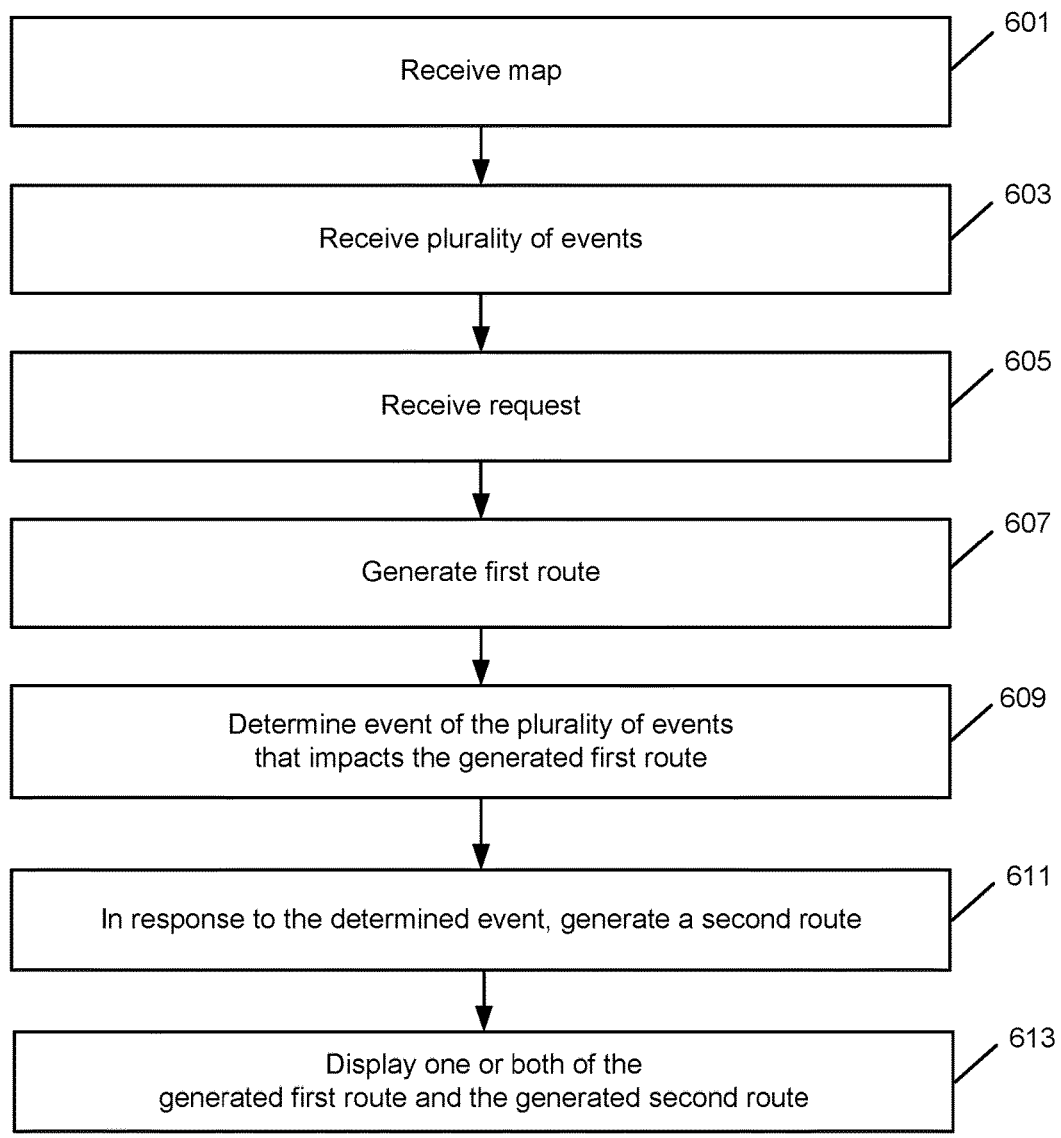
FIG. 6 is an operational flow of an implementation of a method for generating a recommendation in response to a request and a plurality of events.

FIG. 6 is an operational flow of an implementation of a method 600 for generating a recommendation 167 in response to a request 130 and a plurality of events 150. The method 600 may be implemented by the map engine 165 and/or the map client 113.

At 601, a map is received. The map 140 may be received by the map client 113 and/or the map engine 165. The map 140 may include map data 145.

At 603, a plurality of events is received. The plurality of events 150 may be received by the event engine 205 of the map engine 165. The plurality of events 150 may be part of a calendar 175 provided by a calendar source 170. Depending on the implementation, each event 150 may be associated with one or more of a location 251, a time period 252, an area 253, and a severity level 254.

At 605, a request is received. The request 130 may be received by the request engine 210 of the map engine 165. The request 130 may be a request for a route between an origin location and a destination location at some future time. Other types of requests 130 may be supported.

At 607, a first route is generated. The first route may be generated by the request engine 210 of the map engine 165 using map data 145. Depending on the implementation, the first route may be a shortest route by distance and/or time between the origin location associated with the request 130 and the destination location associated with the request 130. The first route may include an ordered plurality or sequence of roads, and an estimated time for each road.

At 609, an event of the plurality of events that impacts the generated first route is determined. The event 150 may be determined by the event engine 210 of the map engine 165. Depending on the implementation, the event 150 may be determined using some or all of the location 251, the time period 252, and the area 253 associated with each event 150. An event 150 may impact a route when the event is likely to cause a delay in the route due to traffic, or some other disruption.

When the area 253 is a radius, the event engine 205 may determine an event 150 that impacts the generated first route by, for each event 150 of the plurality of events 150, generating a circle for the event 150 having the radius associated with the event 150 and a center at the location 251 associated with the event 150. The event engine 205 may determine an event 150 with a generated circle that is intersected by the first route at a time that is within the time period 252 associated with the event 150.

When the area 253 is one or more roads, the event engine 205 may determine an event 150 that impacts the generated first route by determining an event 150 with an associated road that matches a road that is part of the first route at an estimated time that is within the time period 252 associated with the event. Other methods may be used to determine events 150 that impact the first route.

At 611, in response to the determined event, a second route is generated. The second route may be generated by the request engine 210. The second route may be a route between the origin location and the destination location that is not impacted by the determined event 150. In addition, depending on the implementation, the request engine 210 may recommend an alternative time (i.e., an alternative time to start the requested first route).

At 613, one or both of the generated first route and the generated second route are displayed. The generated first route and/or the generated second route may be displayed to the user by the map engine 165 as the recommendation 167. The recommendation 167 may be displayed on a display of a client device 110 associated with the user. Depending on the implementation, the generated routes may be displayed along with information about each route such as estimated time of arrival, and total distance. In addition, information about the determined event 150 may also be displayed.

Figure 7:
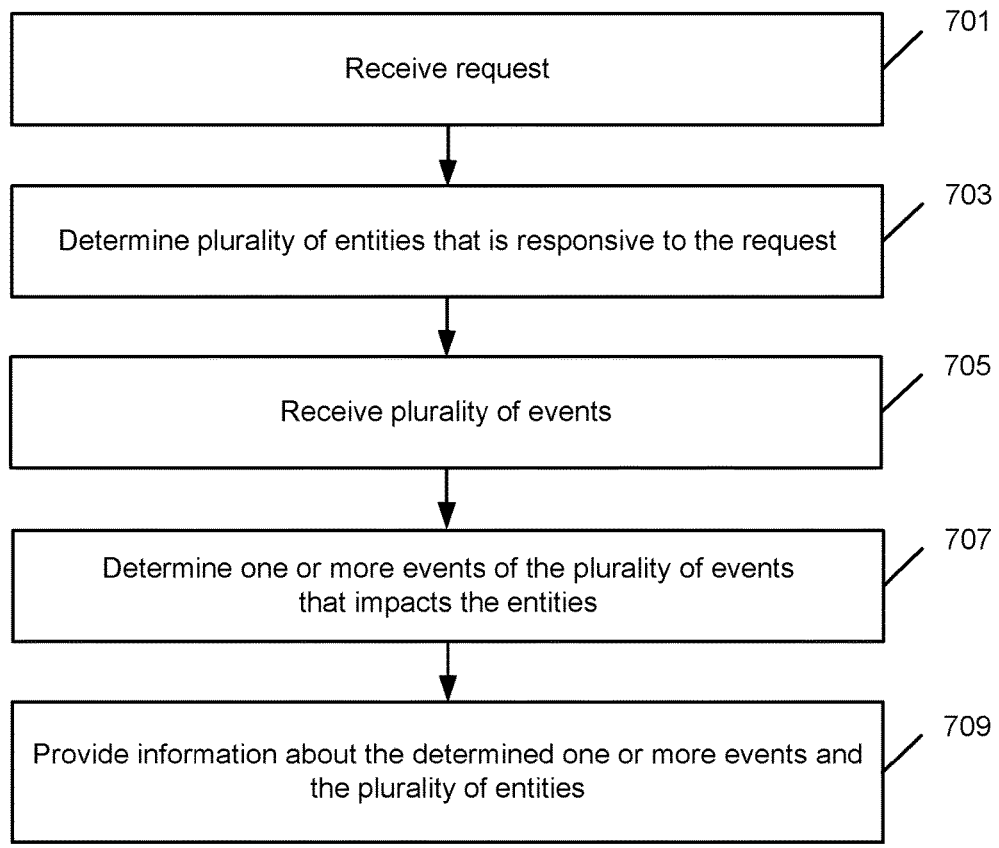
FIG. 7 is an operational flow of an implementation of a method for receiving a request and a plurality of events, determining one or more events that impact the request, and for providing information about the determined one or more events.

FIG. 7 is an operational flow of an implementation of a method 700 for receiving a request and a plurality of events, determining one or more events that impact the request, and for providing information about the determined one or more events. The method 700 may be implemented by the map engine 165 and/or the map client 113.

At 701, a request is received. The request 130 may be received by the request engine 205 of the map engine 165. The request 130 may be a request for an entity and may be include a time period. The entity may be an accommodation, such as a hotel or a motel. Alternatively, the entity may be a restaurant, museum, or landmark, for example.

At 703, a plurality of entities that is responsive to the request is determined. The plurality of entities may be determined by the map engine 165 using the map data 145. The responsive entities may be entities that are available during the time period associated with the request 130, and that are at or near the location associated with the request 130.

At 705, a plurality of events is received. The plurality of events 150 may be received by the event engine 205 of the map engine 165. The plurality of events 150 may be part of a calendar 175 provided by a calendar provider 170. Depending on the implementation, the plurality of events 150 may include events 150 that are associated with a location 251 that is the same as, or near, the location associated with the request 130.

At 707, one or more events of the plurality of events that impacts the entities is determined. The one or more events 150 may be determined by the event engine 205 of the map engine 165. Where the area 253 associated with an event 130 is a radius, the event engine 220 may determine that the event 130 impacts the entity when the location associated with the entity is within a circle formed by the radius associated with the event 130, and the time period associated with the request 130 is within or overlaps the time period 252 associated with the event 130. Where the area 253 associated with the event 130 includes one or more roads, the event engine 220 may determine that the event 130 impacts the entity when the roads associated with the entity (e.g., address) are also associated with the event 130, and the time period associated with the request 130 is within or overlaps the time period 252 associated with the event 130.

At 709, information about the determined one or more events and the plurality of entities is provided. The information may be provided by the map engine 165 as the recommendation 167. In some implementations, the recommendation 167 may be displayed to the user of a display associated with the client device 110. In addition, depending on the implementation, the request engine 210 may recommend an alternative time (i.e., an alternative departure time or arrival time for the request 130).

Figure 8:
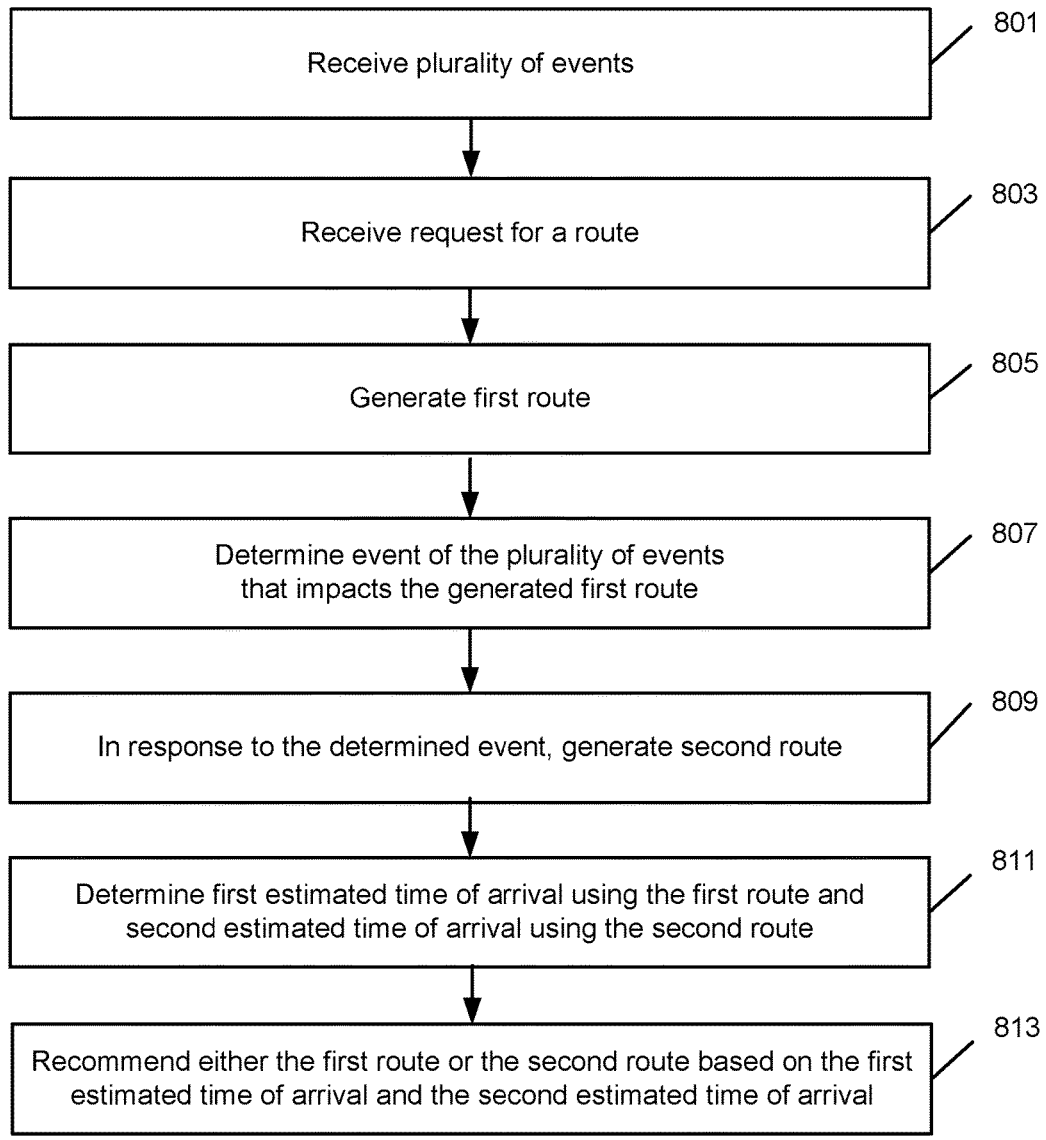
FIG. 8 is an operational flow of an implementation of a method for receiving a plurality of events, receiving a request for a route, and for recommending one or more routes in response to the request based on the plurality of events.

FIG. 8 is an operational flow of an implementation of a method 800 for receiving a plurality of events, receiving a request for a route, and for recommending one or more routes in response to the request based on the plurality of events. The method 800 may be implemented by the map engine 165 and/or the map client 113.

At 801, a plurality of events is received. The plurality of events 150 may be received by the event engine 205 of the map engine 165. Depending on the implementation, each event 150 may be associated with one or more of a location 251, a time period 252, an area 253, and a severity level 254.

At 803, a request for a route is received. The request 130 may be received by the request engine 210 of the map engine 165. The request 130 may be a request for a route between an origin location and a destination location at some future time. Other types of requests 130 may be supported.

At 805, a first route is generated. The first route may be generated by the request engine 210 of the map engine 165 using map data 145.

At 807, an event of the plurality of events that impacts the generated first route is determined. The event 150 may be determined by the event engine 210 of the map engine 165. Depending on the implementation, the event 150 may be determined using some or all of the location 251, time period 252, and area 253 associated with each event 150. An event 150 may impact the first route if traffic associated with the event 150 is likely to cause a delay for a user traveling the first route at the time associated with the request 130.

At 809, in response to the determined event, a second route is generated. The second route may be generated by the request engine 210. The second route may be a route 130 between the origin location and the destination location that is not impacted by the determined event 150.

At 811, a first estimated time of arrival is determined for the first route and a second estimated time of arrival is determined for the second route. The estimated times of arrival may be determined by the request engine 210 using the map data 145. The first estimated time of arrival for the first route may include delay associated with the determined event 150. The delay may be based on the severity level 254 associated with the event 130, for example.

At 813, either the first route or the second route are recommended based on the first estimated time of arrival and the second estimated time of arrival. Depending on the implementation, the request engine 210 may recommend the route having the shortest estimated time of arrival as the recommendation 167. Alternatively, the request engine 210 may also consider the lengths of the first route and the second route when making the recommendation. For example, if the second estimated time of arrival is less than the first estimated time of arrival, but the length of the second route is much longer in distance than the first route, then the request engine 210 may recommend the first route. The maximum distance that a second route may be larger than a first route may be set by a user or an administrator, or may be a function of the time saved by the second route over the first route. Where an alternative time was determined, the request engine 210 may further recommend the alternative time.

FIG. 9 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 9, an exemplary system for implementing aspects described herein includes a computing device, such as computing device 900. In its most basic configuration, computing device 900 typically includes at least one processing unit 902 and memory 904. Depending on the exact configuration and type of computing device, memory 904 may be volatile (such as random access memory (RAM)), non-volatile (such as read-only memory (ROM), flash memory, etc.), or some combination of the two. This most basic configuration is illustrated in FIG. 9 by dashed line 906.

Computing device 900 may have additional features/functionality. For example, computing device 900 may include additional storage (removable and/or non-removable) including, but not limited to, magnetic or optical disks or tape. Such additional storage is illustrated in FIG. 9 by removable storage 908 and non-removable storage 910.

Computing device 900 typically includes a variety of computer readable media. Computer readable media can be any available media that can be accessed by the device 900 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 904, removable storage 908, and non-removable storage 910 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of computing device 900.

Computing device 900 may contain communication connection(s) 912 that allow the device to communicate with other devices. Computing device 900 may also have input device(s) 914 such as a keyboard, mouse, pen, voice input device, touch input device, etc. Output device(s) 916 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, a system for receiving events, and for generating a route in response to a request based on a time period associated with each event and a time associated with the request is provided. The system includes at least one computing device and a map engine. The map engine may be adapted to: receive a map; receive a plurality of events, wherein each event is associated with a time period, and each event is associated with a location; receive a request, wherein the request is associated with an origin location, a destination location, and a time; generate a first route between the origin location and the destination location based on the map; determine an event of the plurality of events that impacts the generated first route based on the first route, the location associated with each event, the time period associated with each event, and the time associated with the request; and in response to the determined event, generate a second route between the origin location and the destination location, wherein the determined event does not impact the second route.

Implementations may include some or all of the following features. The map engine may be further adapted to display one or both of the generated second route and the generated first route along with information about the determined event. The plurality of events may be associated with a calendar. Each event may be associated with a radius, and the map engine adapted to determine an event of the plurality of events that impacts the first route may include the map engine adapted to: for each event of the plurality of events, associate the event with a circle on the map having the radius associated with the event and a center at the location associated with the event; and determine an event whose associated circle is intersected by the first route on the map at a time that is within the time period associated with the event based on the time associated with the request. The first route may include one or more roads of a plurality of roads and each road of the one or more roads is associated with a time. Each event may be associated with one or more roads of the plurality of roads, and the map engine adapted to determine an event of the plurality of events that impacts the first route may include the map engine adapted to: determine an event with an associated road that matches a road of the first route, wherein the matching road of the first route has an associated time that is within the time period associated with the event. Each event may be associated with a severity level, and the map engine may be further adapted to: determine a first estimated time of arrival at the destination location using the first route based on the severity level associated with the determined event; determine a second estimated time of arrival at the destination location using the second route; and recommend either the first route or the second route based on the first estimated time of arrival and the second estimated time of arrival. The location associated with each event may include longitude and latitude coordinates. The map engine may be further adapted to: in response to the determined event, determine an alternative time for the request; and display the alternative time with the generated first route. Each event may include one or more of festivals, sporting events, graduations, and parades.

In an implementation, a system for receiving events, and for generating a route in response to a request based on a time period associated with each event and a time associated with the request is provided. The system includes at least one computing device and a map engine. The map engine may be adapted to: receive a request, wherein the request is associated with a location, an arrival time, and a departure time; determine a plurality of entities that are responsive to the request based on a location associated with each entity and the location associated with the request; receive a plurality of events, wherein each event is associated with a time period, and each event is associated with a location; for each entity of the plurality of entities, determine one or more events of the plurality of events that impacts the entity based on the location associated with the entity, the locations associated with the plurality of events, the time periods associated with the plurality of events, and the arrival time and the departure time associated with the request; and provide information about the plurality of entities and the determined one or more events.

Implementations may include some or all of the following features. The entities may be one or more of restaurants, accommodations, or tourist attractions. Each event may be associated with a radius, and the map engine adapted to determine one or more events of the plurality of events that impacts the entity based on the location associated with the entity, the locations associated with the plurality of events, the time periods associated with the plurality of events, and the arrival time and the departure time associated with the request may include the map engine adapted to, for each of the one or more events: determine that the location associated with the entity is within a circle with the radius associated with the event and a center at the location associated with the event on a map; and if so, determine that the event impacts the entity. Each event may be associated with one or more roads of a plurality of roads and the location associated with each entity is an address, and the map engine adapted to determine one or more events of the plurality of events that impacts the entity based on the location associated with the entity, the locations associated with the plurality of events, the time periods associated with the plurality of events, and the arrival time and the departure time associated with the request may include the map engine adapted to, for each of the one or more events: determine that the address associated with the entity is located on a road that is associated with the event; and if so, determine that the event impacts the entity. The map engine may be further adapted to: recommend one or more of an alternative arrival time or an alternative departure time for the request based on the determined one or more events. Each event may include one or more of festivals, sporting events, graduations, and parades.

In an implementation, a method for recommending routes based on a request and one or more events is provided. The method includes: receiving a plurality of events by a computing device, wherein each event is associated with a time period and a severity level, and each event is associated with a location on a map; receiving a request by the computing device, wherein the request is associated with an origin location on the map, a destination location on the map, and a time; generating a first route between the origin location and the destination location based on the map by the computing device; determining an event of the plurality of events that impacts the generated first route based on the first route, the location associated with each event, the time period associated with each event, and the time associated with the request by the computing device; in response to the determined event, generating a second route between the origin location and the destination location by the computing device, wherein the determined event does not impact the second route; determining a first estimated time of determined event by the computing device; determining a second estimated time of arrival at the destination location using the second route by the computing device; and recommending either the first route or the second route based on the first estimated time of arrival and the second estimated time of arrival by the computing device.

Implementations may include some or all of the following features. The plurality of events may be associated with a calendar. Each event may be associated with a radius, and determining an event of the plurality of events that impacts the first route may include: for each event of the plurality of events, associating the event with a circle on the map having the radius associated with the event and a center at the location associated with the event; and determining an event whose associated circle is intersected by the first route on the map at a time that is within the time period associated with the event based on the time associated with the request. The first route may include one or more roads of a plurality of roads and each road of the one or more roads may be associated with a time. Each event may be associated with one or more roads of the plurality of roads, and determining an event of the plurality of events that impacts the first route may include: determining an event with an associated road that matches a road of the first route, wherein the matching road of the first route has an associated time that is within the time period associated with the event.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for receiving events, and for generating a route in response to a request based on a time period associated with each event and a time associated with the request, the system comprising:
   at least one computing device; and
   a map engine adapted to:
      receive a map;
      receive a plurality of events, wherein each event is associated with a time period, and each event is associated with a location;
      receive a request, wherein the request is associated with an origin location, a destination location, and a time;
      generate a first route between the origin location and the destination location based on the map;
      determine an event of the plurality of events that impacts the generated first route based on the first route, the location associated with each event, the time period associated with each event, and the time associated with the request;
      in response to the determined event, generate a second route between the origin location and the destination location based on the map, wherein the determined event does not impact the second route; and
      recommend one of the first route and the second route based on distances of the first route and the second route and a maximum distance that a second route may be larger than a first route.

2. The system of claim 1, wherein the map engine is further adapted to display one or both of the generated second route and the generated first route along with information about the determined event.

3. The system of claim 1, wherein the plurality of events is associated with a calendar.

4. The system of claim 1, wherein each event is associated with a radius, and the map engine adapted to determine an event of the plurality of events that impacts the first route comprises the map engine adapted to:
   for each event of the plurality of events, associate the event with a circle on the map having the radius associated with the event and a center at the location associated with the event; and
   determine an event whose associated circle is intersected by the first route on the map at a time that is within the time period associated with the event based on the time associated with the request.

5. The system of claim 1, wherein the first route comprises one or more roads of a plurality of roads, and each road of the one or more roads is associated with a time.

6. The system of claim 5, wherein each event is associated with one or more roads of the plurality of roads, and the map engine adapted to determine an event of the plurality of events that impacts the first route comprises the map engine adapted to determine an event with an associated road that matches a road of the first route, wherein the matching road of the first route has an associated time that is within the time period associated with the event.

7. The system of claim 1, wherein each event is associated with a severity level, and the map engine is further adapted to:
   determine a first estimated time of arrival at the destination location using the first route based on the severity level associated with the determined event;
   determine a second estimated time of arrival at the destination location using the second route; and
   recommend either the first route or the second route based on the first estimated time of arrival and the second estimated time of arrival.

8. The system of claim 1, wherein the location associated with each event comprises longitude and latitude coordinates.

9. The system of claim 1, wherein the map engine is further adapted to:
   in response to the determined event, determine an alternative departure time for the request; and
   display the alternative departure time with the generated first route.

10. A method for recommending routes based on a request and one or more events comprising:
   receiving a plurality of events by a computing device, wherein each event is associated with a time period and a severity level, and each event is associated with a location on a map;
   receiving a request by the computing device, wherein the request is associated with an origin location on the map, a destination location on the map, and a time;
   generating a first route between the origin location and the destination location based on the map by the computing device;
   determining an event of the plurality of events that impacts the generated first route based on the first route, the location associated with each event, the time period associated with each event, and the time associated with the request by the computing device;
   in response to the determined event, generating a second route between the origin location and the destination location based on the map by the computing device, wherein the determined event does not impact the second route;
   determining a first estimated time of arrival at the destination location using the first route based on the severity level associated with the determined event by the computing device;
   determining a second estimated time of arrival at the destination location using the second route by the computing device; and
   recommending, by the computing device, either the first route or the second route based on the first estimated time of arrival and the second estimated time of arrival and based on distances of the first route and the second route and a maximum distance that a second route may be larger than a first route.

11. The method of claim 10, wherein the plurality of events is associated with a calendar.

12. The method of claim 10, wherein each event is associated with a radius, and determining an event of the plurality of events that impacts the first route comprises:

for each event of the plurality of events, associating the event with a circle on the map having the radius associated with the event and a center at the location associated with the event; and determining an event whose associated circle is intersected by the first route on the map at a time that is within the time period associated with the event based on the time associated with the request.

13. The method of claim 10, wherein the first route comprises one or more roads of a plurality of roads and each road of the one or more roads is associated with a time.

14. The method of claim 13, wherein each event is associated with one or more roads of the plurality of roads, and determining an event of the plurality of events that impacts the first route comprises determining an event with an associated road that matches a road of the first route, wherein the matching road of the first route has an associated time that is within the time period associated with the event.

15. The method of claim 10, wherein the map engine is further adapted to display one or both of the generated second route and the generated first route along with information about the determined event.

16. The method of claim 10, wherein the location associated with each event comprises longitude and latitude coordinates.

17. The method of claim 10, wherein the map engine is further adapted to:

in response to the determined event, determine an alternative departure time for the request; and display the alternative departure time with the generated first route.

* * * * *